United States Patent
Estevez et al.

(10) Patent No.: US 9,521,614 B2
(45) Date of Patent: Dec. 13, 2016

(54) POWER EFFICIENT METHOD FOR WI-FI HOME AUTOMATION

(71) Applicant: TEXAS INSTRUMENTS INCORPORATED, Dallas, TX (US)

(72) Inventors: Leonardo W. Estevez, Rowlett, TX (US); Paul Kimelman, Alamo, CA (US); Avraham Baum, Givat-shmuel (IS)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 215 days.

(21) Appl. No.: 14/034,439

(22) Filed: Sep. 23, 2013

(65) Prior Publication Data

US 2015/0085725 A1    Mar. 26, 2015

(51) Int. Cl.
*H04W 4/00* (2009.01)
*H04W 52/02* (2009.01)
*H04W 84/18* (2009.01)

(52) U.S. Cl.
CPC ......... *H04W 52/0206* (2013.01); *H04W 84/18* (2013.01); *Y02B 60/50* (2013.01)

(58) Field of Classification Search
CPC .... H04W 52/0206; H04W 84/18; Y02B 60/50
USPC ....................................................... 370/338
See application file for complete search history.

(56) References Cited

U.S. PATENT DOCUMENTS

| | | | | |
|---|---|---|---|---|
| 8,019,082 B1* | 9/2011 | Wiedmann | ............ | H04L 63/162 370/245 |
| 8,126,145 B1* | 2/2012 | Tewari | .................. | H04L 9/0841 370/401 |
| 2006/0045272 A1* | 3/2006 | Ohaka | .................. | H04L 9/3271 380/270 |
| 2006/0056634 A1* | 3/2006 | Lee | ......................... | H04L 63/20 380/270 |
| 2010/0066839 A1* | 3/2010 | Azuma | ................ | G11B 27/034 348/207.1 |
| 2010/0074236 A1* | 3/2010 | Takeda | .................. | H04W 24/04 370/338 |
| 2010/0085443 A1* | 4/2010 | Maeda | ............... | H04N 1/00172 348/231.2 |
| 2010/0211777 A1* | 8/2010 | Ishihara | ................ | H04W 12/02 713/166 |
| 2012/0254022 A1* | 10/2012 | Kimura | ................. | H04W 84/20 705/39 |
| 2013/0034023 A1* | 2/2013 | Jung | ..................... | H04L 67/104 370/255 |
| 2013/0054863 A1* | 2/2013 | Imes | ................... | H04L 12/2827 710/304 |
| 2013/0065538 A1* | 3/2013 | Kim | ...................... | H04W 76/02 455/68 |

(Continued)

*Primary Examiner* — Thai Hoang
(74) *Attorney, Agent, or Firm* — Ronald O. Neerings; Frank D. Cimino

(57) ABSTRACT

A method for automation and control of a wireless device in a WiFi environment. The method includes a wireless mobile device configured with a soft access point (softAP) transmitting probe requests to home automation devices and traditional stationary access points. The wireless mobile device periodically wakes up to scan for other services, sends a probe request, authenticates the received probe response from the another device and receives control information via the received probe response.

13 Claims, 7 Drawing Sheets

(56) References Cited

U.S. PATENT DOCUMENTS

| | | | | |
|---|---|---|---|---|
| 2013/0128755 A1* | 5/2013 | Ullah | ............ | G01S 5/02 |
| | | | | 370/252 |
| 2013/0137373 A1* | 5/2013 | Choi | ............ | H04B 5/0031 |
| | | | | 455/41.1 |
| 2013/0170482 A1* | 7/2013 | Jung | ............ | H04W 8/005 |
| | | | | 370/338 |
| 2013/0173811 A1* | 7/2013 | Ha | ............ | H04W 76/02 |
| | | | | 709/227 |

* cited by examiner

POWER EFFICIENT METHOD FOR WI-FI HOME AUTOMATION

TECHNICAL FIELD

The present disclosure is directed, in general, to wireless communication systems and, more specifically, to wireless control of devices around a home both locally and remotely. In particular, the disclosure describes a power efficient method for the control of Wi-Fi enabled devices in a home.

BACKGROUND

Wi-Fi Direct is a standard recently released by the Wi-Fi Alliance that specifies a means for devices to negotiate who will function as an Access Point (AP) versus a connecting Station (STA). A Wi-Fi Direct device acting as an AP is called a Group Owner. A Group Owner responds to station probe requests with its Service Set Identifier (SSID) in the same way an AP does so that legacy devices which do not have Wi-Fi Direct support may scan for and connect to a Wi-Fi Direct Group Owner in exactly the same way they would a normal AP. Wi-Fi Direct devices connect easily with each other without requiring a wireless access point. They communicate at typical Wi-Fi speeds for everything from file transfer to internet connectivity.

A Wi-Fi Home Automation Device (HAD) is a device which may be controlled via Wi-Fi enabled mobile phone or access point to change state. It's desirable for many of these devices to be battery operated since consumer electrical connection to power at home is often inconvenient, unappealing, and hazardous. The battery life of an HAD may be significantly enhanced by increasing the amount of time the device sleeps between queries for new commands. This time is referred to as the sleep interval. As the sleep interval of an HAD is increased, its response latency to commands may become too long. For example, most consumers don't want to wait several seconds for lights to turn on when entering a dark room. A method for temporarily decreasing the sleep interval of an HAD when it's most likely a person will want to change its state is therefore desirable. The amount of power that can be saved by a connectionless or unassociated query is significant. An unassociated query typically involves a probe request which is often sent in less than a millisecond followed by a probe response. Probe responses are often received within a few milliseconds so the amount of time the HAD must spend with its receiver on is small. The process of authenticating, associating, and querying a connected device through an access point, on the other hand, can be on the order of several hundreds of milliseconds throughout which the device's receiver must remain on.

As mobile phones with softAP and Wi-Fi Direct functionality become increasingly widespread, consumers will want to be able to directly connect with and control Wi-Fi devices around their home. Mobile phones with softAP (software enabled Access Point) functionality create a wireless hotspot, via emulation as an access point, to enable nearby wireless devices to communicate the internet and with other devices. Home automation devices (HAD) enable consumers to locally or remotely control appliances in their home. Smart Energy devices enable synchronized operation of consumer appliances in such a way to balance electrical distribution demands while saving consumers money on their electric bills. Both fields require that the consumer be able to control a home appliance. Given the installed base of Wi-Fi access points in homes and in mobile phones, Wi-Fi (IEEE 802.11) is a natural technology for these fields. Wi-Fi is an energy efficient technology at higher bit rates. However, the overhead associated with maintaining or reestablishing a connection for a few bytes of data make it less energy efficient at low bit rates. As such, Wi-Fi communication in its standard form is not power efficient and many products based on low power Zigbee solutions are currently being deployed in these fields. Therefore, a more efficient Wi-Fi method and device is needed.

SUMMARY

Embodiments of the present disclosure provide a wireless device and methods of operating a wireless device. In one embodiment, the wireless device periodically wakes up to scan for other devices, sends a Probe Request, authenticates the received probe response from the other device and receives control information via the received probe response.

In another embodiment, the wireless device confirms that the other device has responded with an encoded control message in its SSID and indicates successful reception of the message by sending a subsequent Probe Request at some time interval which is specified within the control message.

In yet another embodiment, the wireless device adjusts the interval at which the device wakes up and sends out Probe Requests based on either the presence of the other device or the change in Received Signal Strength Indicator (RSSI) of the other device.

In still yet another embodiment, the automation and control of wireless devices comprises a device receiving an encryption key and authentication table from a mobile device, wherein the device uses this key to subsequently encrypt both control and authentication information in the SSID while the device will only accept encrypted and authenticated SSID information from other devices.

In still yet another embodiment, the automation and control of wireless devices comprises a device which determines whether another wireless device has entered the range of the device, wherein the determination is based upon RSSI and then sends an encoded SSID response if the RSSI exceeds a threshold, where the SSID contains control information.

In a further embodiment, the automation and control of wireless devices comprises moving a device through various areas or zones in a building to collect RSSI information, wherein the movement and collection enables the device to associate the RSSIs to other devices. The device then sends control responses including the RSSIs of the nearby access points.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Figure 1:
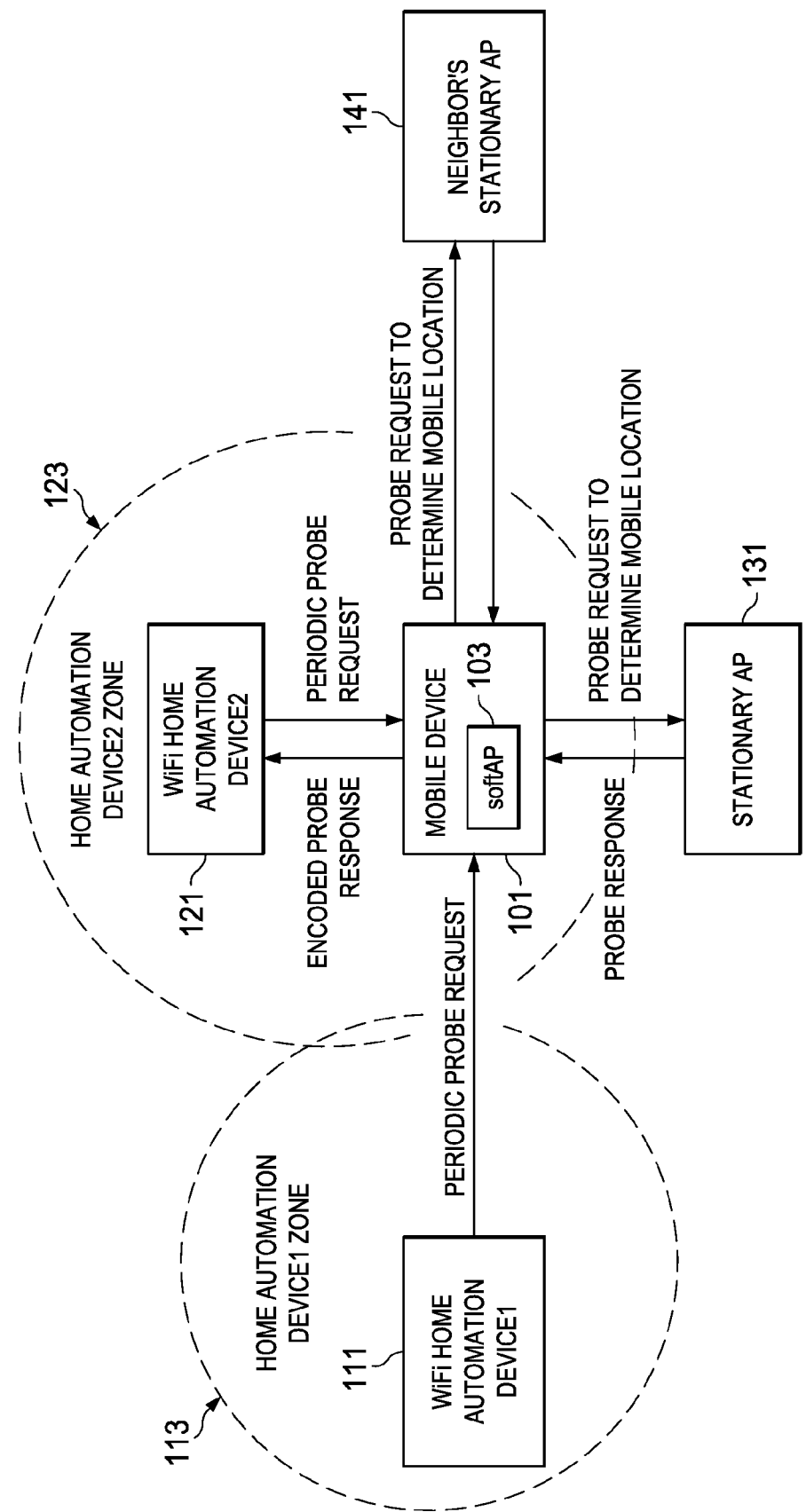
FIG. 1 depicts the basic concept of how a mobile device would determine its location within a home environment and transmit control encoded Service Set Identifiers (SSIDs) to specific devices at that time.

The specification discusses a method and apparatus for adaptive response and power consumption of battery operated devices requiring discovery and control. For example, the method enables a mobile user to efficiently and automatically alter the state of Wi-Fi home automation devices while not compromising response latency. One component of the invention leverages the standard mechanism that all Wi-Fi devices use to discover a network: an active scan for access points. Access Points (AP) are nominally fixed wireless devices which enable access to a larger network, such as the internet. When performing an active scan, a Wi-Fi station broadcasts a Probe Request for available APs (i.e. networks) to respond to. The APs respond to this Probe Request with a Probe Response which contains the SSID (Note, an AP may have multiple SSIDs). A Service Set Identifier (SSID) describes a Wi-Fi network to which a mobile station can connect or associate. Each SSID has a specific security policy (and often encryption key) requiring stations to authenticate themselves (if not open) before enabling association. Most SSIDs are publicly broadcast by all Wi-Fi stations (while some may have hidden SSIDs). The scanning station typically sends out Probe Requests and listens for Probe Responses on multiple channels. The amount of time the station listens for responses is called the dwell time. When there are multiple SSIDs responding, the dwell time required to receive a given response may be longer than if there are just one or two SSIDs. Although most smart phones can function as Wi-Fi stations today, there is an increasing trend to enable mobiles to also act as an AP or softAP since this functionality is implemented in software.

For example, all new Android and iPhone smartphones (the present majority of the smartphone market) and Windows 7 laptops currently support both Station and softAP modes. In the Station mode, these devices are capable of both scanning for APs and responding to AP scans/probe requests. In the softAP mode, the smartphone provides mobile stations (STAs) wireless access to the internet via the cellular data network or other Wi-Fi connected mobile stations. The specification describes a method in which the common station mode is used to determine when a mobile station is within an area previously associated with the control of a home automation device—at which point in time, a control application running on the mobile phone may reconfigure the mobile to start behaving as a softAP. The SSIDs provided in these responses may be encrypted and authenticated to provide secure control information without having to maintain association with a network. Although present mobiles only support either station or softAP mode operation, future mobiles will enable mobile devices to act as both a station and as a softAP at the same time enabling a connectionless control protocol to be used without disrupting an existing Wi-Fi internet connection.

An embodiment of the invention can be implemented with any mobile device and/or stationary Access Point (AP) supporting AP or Wi-Fi Direct Group Owner functionality with standardized responses to probe requests. Any Wi-Fi home automation device supporting standard AP scanning with the ability to set maximum/minimum dwell times may also be used.

Finger Printing is commonly used in indoor Wi-Fi environments to determine the location of a mobile station in that environment. Finger Printing utilizes statistics of a specific set of SSIDs and their RSSIs in an area of interest to determine whether a mobile station is in that area. Finger printing techniques need not be tied to a map and do not require knowledge of AP locations.

A control zone is an area within or around a home in which a mobile user sends control messages to a home automation device. Control zones may be overlapping for different automation devices and highly constrained for others. The control zone for a given home automation device is determined from the average of received SSID RSSIs over a history of commands sent by a controlling mobile. A mobile device can determine whether it is in the control zone of a given HAD by comparing the received RSSIs of probe responses with SSIDs to determine whether they are within some threshold variance of the average of SSID RSSIs previously received when controlling that HAD.

For example, it would be desirable to open the garage from both outside and inside the home. A controlling mobile device might scan and receive a set of unique SSIDs with RSSIs when the mobile user sends a command to open the garage to leave from within the home. Once the user has exited the garage, the mobile device might scan and receive another set of unique SSIDs with RSSIs when the command to close the garage is sent. The control zone represented by the average and variance of RSSIs seen when the user is in and outside the garage is subsequently used by the mobile device to determine whether it is in the garage door's control zone. A battery operated window blind might, on the other hand, have a control zone constrained to a few feet in front of it because the user only sends commands to it when in the room.

FIG. 1 depicts the basic concept of how a mobile device would determine its location within a home environment and transmit control encoded SSIDs to specific devices at that time. This is critical to the power efficiency of battery operated Wi-Fi devices which can periodically wake up and transmit a probe request with long sleep intervals until a Wi-Fi device that detects it is within that device's control area (using RSSI finger printing techniques) transmits a probe response with encoded SSID decrease this sleep interval (and response latency). The average power consumption for mobile transmission of periodic probe requests to determine location is orders of magnitudes less than the power consumption required to listen for probe requests. In addition, FIG. 1 depicts a Wi-Fi home automation environment which includes several apparatus and a method of low-power communication and control. A Mobile device 101 running software enabling it to act as a soft AP 103 is attempting to communicate with Wi-Fi Home Automation Device 111 within Home Automation Device Zone 113. Wi-Fi device 111 is shown sending a periodic probe request to the Mobile device 101 with softAP 103. The Mobile device 101 with softAP 103 is periodically sending probe requests to determine whether or not it has entered a control zone with a specific set of SSID RSSIs that are consistent within an acceptable variance of the RSSIs received while previously communicating with Home Automation Device 111. Mobile device 101 is moving towards Wi-Fi device 111. Once Mobile device 101 has determined it is within control zone 113, it will respond to probe requests with an encoded SSID (by application software enablement of the softAP function with that SSID) to the home automation device 111. At that time Wi-Fi Device 111 will reduce the sleep interval at which it wakes up to send probe requests to ensure better response latency when a probe response containing an encoded SSID control is subsequently received from the Mobile device 101 with softAP 103. The reception of the subsequent Probe Request from Home Automation Device 111 at the recently requested sleep interval also serves as an acknowledgement to the Mobile device 101 that the probe response was successfully received and processed.

Figure 2:
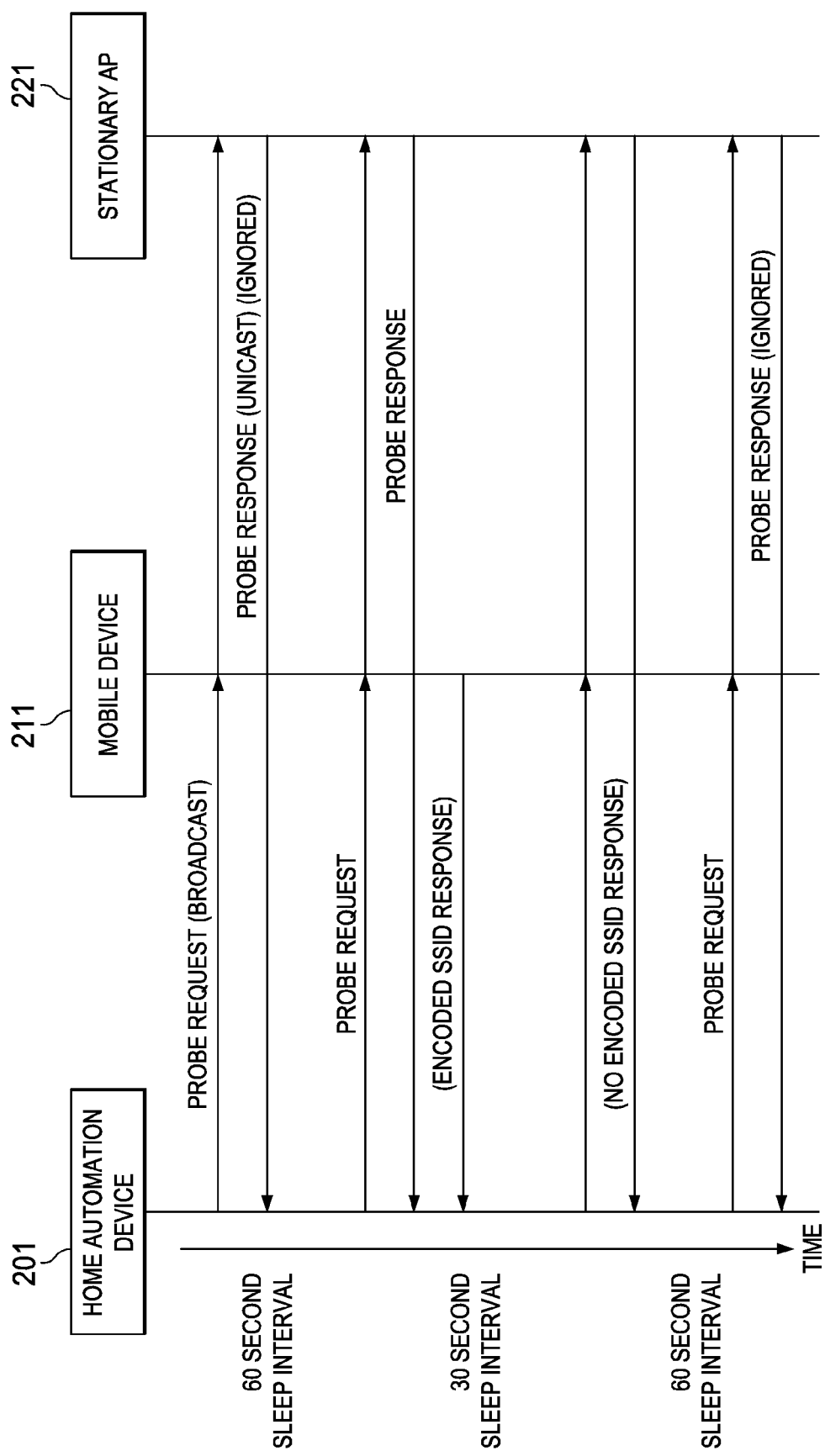
FIG. 2 depicts a sequence diagram showing how the sleep interval of a given home automation device might change over time.

FIG. 2 depicts a sequence diagram showing how the sleep interval of a given home automation device might change over time. In this figure, Home Automation Device 201 broadcasts a Probe Request to Mobile Device 211 and Stationary AP 221. Only the stationary AP 221 responds, but since its SSID is not recognized as an authenticated control SSID, it's ignored. On the subsequent Probe Request from Home Automation Device 201, the Mobile Device 211 has broadcast an authenticated control SSID with a command to reduce sleep interval (and Probe Request rate) to 30 seconds. The Home Automation Device 201 subsequently wakes up and sends the next Probe Request 30 seconds later. If the mobile user does not wish to send a command, the Mobile Device 211 does not respond. The Home Automation device 201 subsequently returns to its previous scanning frequency and continues ignoring responses from the Stationary AP which does not respond with authenticated control SSIDs.

Multiple mobile devices with softAP may be authenticated to control a home automation device by providing their own authentication tables while connected. The MAC address of each responding mobile device is associated with its authentication table.

Figure 3:
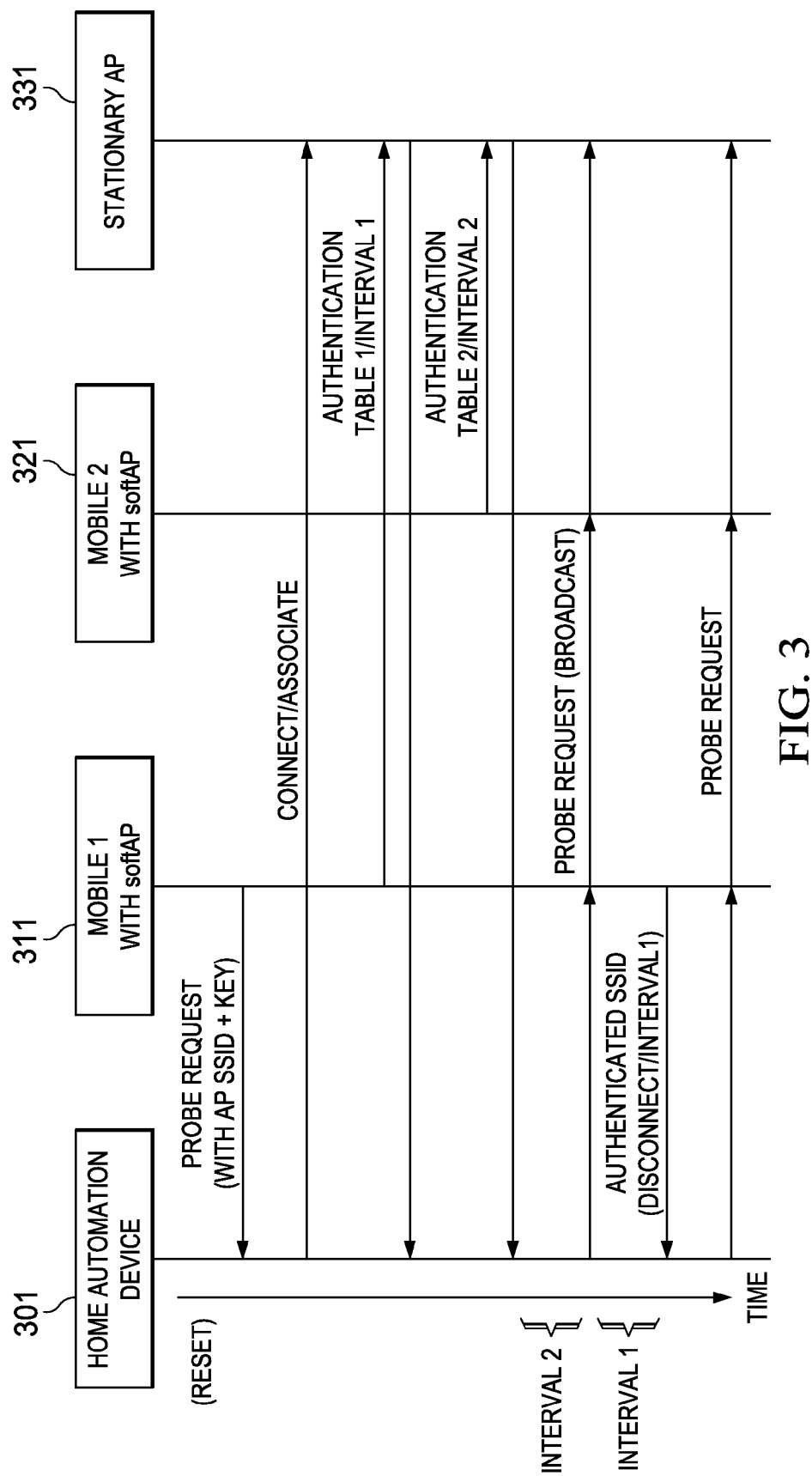
FIG. 3 shows how the home automation device is authenticated to a stationary AP and two different mobiles.

FIG. 3 depicts how the home automation device is authenticated to a stationary AP and two different mobile devices. FIG. 3 shows a sequence diagram that includes a Home Automation Device 301, a first Mobile with softAP 311, a second Mobile with softAP 321, and a Stationary AP 331. Upon power up or reset of the Home Automation Device 301, Mobile1 with softAP 311 sends a probe request with information elements containing the Stationary AP 331 SSID and encryption key (WEP or WPA). Once the Home Automation device 301 has received the SSID and encryption key, it connects with the stationary AP and receives and authentication table with sleep interval from Mobile1 with softAP 311. Because it may be desirable to control a device from multiple mobiles, a separate authentication table must be kept for each mobile device. Home Automation Device 301 subsequently receives another authentication table with a different sleep interval from Mobile2 with softAP 321. The Home Automation Device 301 then begins sending out probe requests at the last interval specified (interval2). Mobile1 with softAP 311 responds to this probe requested with an authenticated SSID instructing Home Automation Device 301 to disconnect from the network and to send probe requests after a newly specified sleep interval (interval1). Home Automation Device 301 disconnects and broadcasts probe requests with the sleep interval1 specified by the last device to control, (Mobile with softAP 311).

Figure 4:
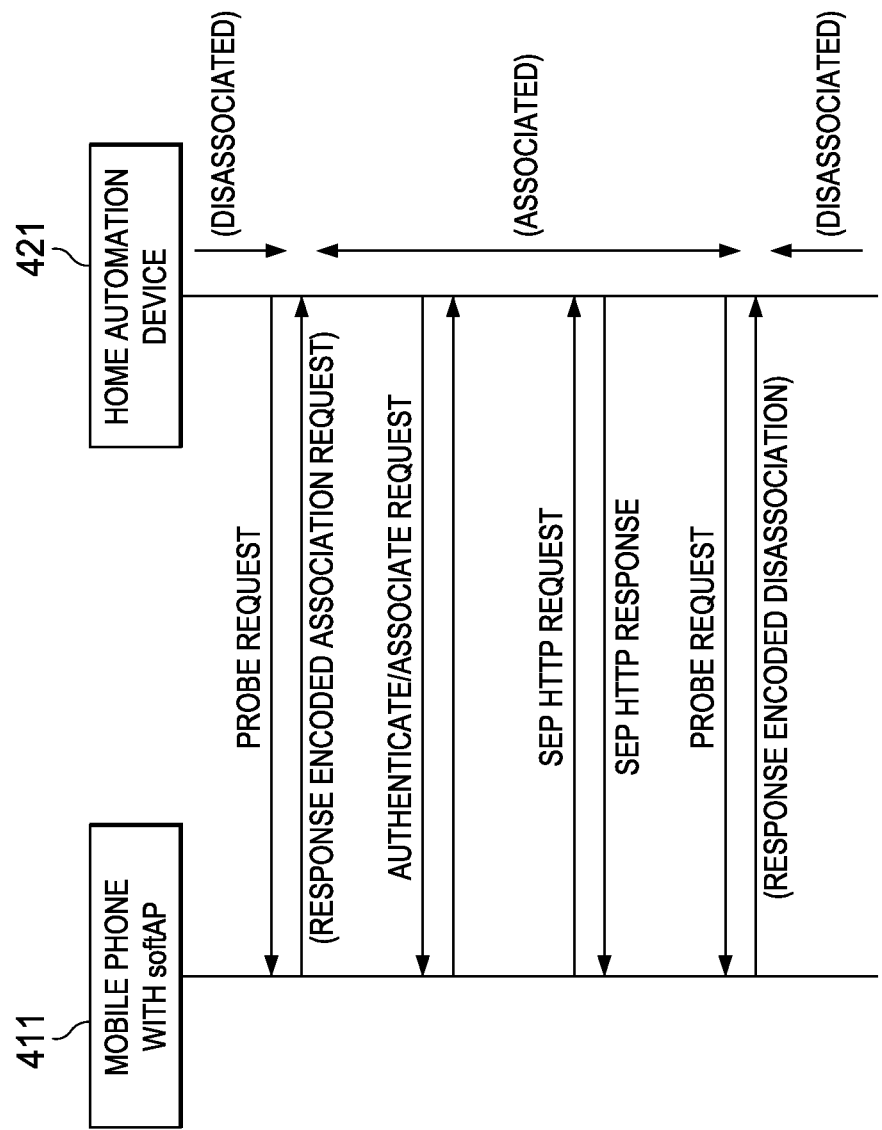
FIG. 4 depicts how a Home Automation Device may be commanded to associate for IP based communication.

FIG. 4 depicts how a Home Automation Device (HAD) may be commanded to associate for IP based communication. This may be desirable when remote server or HTTP communication is needed. For example, if usage information of a given HAD is to be previewed, the device might serve a web page with this information or provide this information via SEP HTTP messages to a local mobile or remote server. In the method depicted in FIG. 4, Mobile Phone with softAP 411 responds to a probe request from Home Automation Device 421 with an authenticated SSID command to associate with mobile with softAP 411. Mobile Phone with softAP 411 then communicates with Home Automation Device 421 using a standard IP protocol such as Smart Energy Profile (SEP) 2.0. After this exchange is complete, Mobile Phone with softAP 411 responds to a probe request from HAD 421 with an authenticated SSID command to disassociate from Mobile Phone with softAP 411. Home Automation Device 421 subsequently disconnects from the network and periodically wakes up to send probe requests as previously described. In this example, the Mobile Phone with soft AP 411 must have previously shared the needed authentication key to connect with its softAP.

Figure 5:
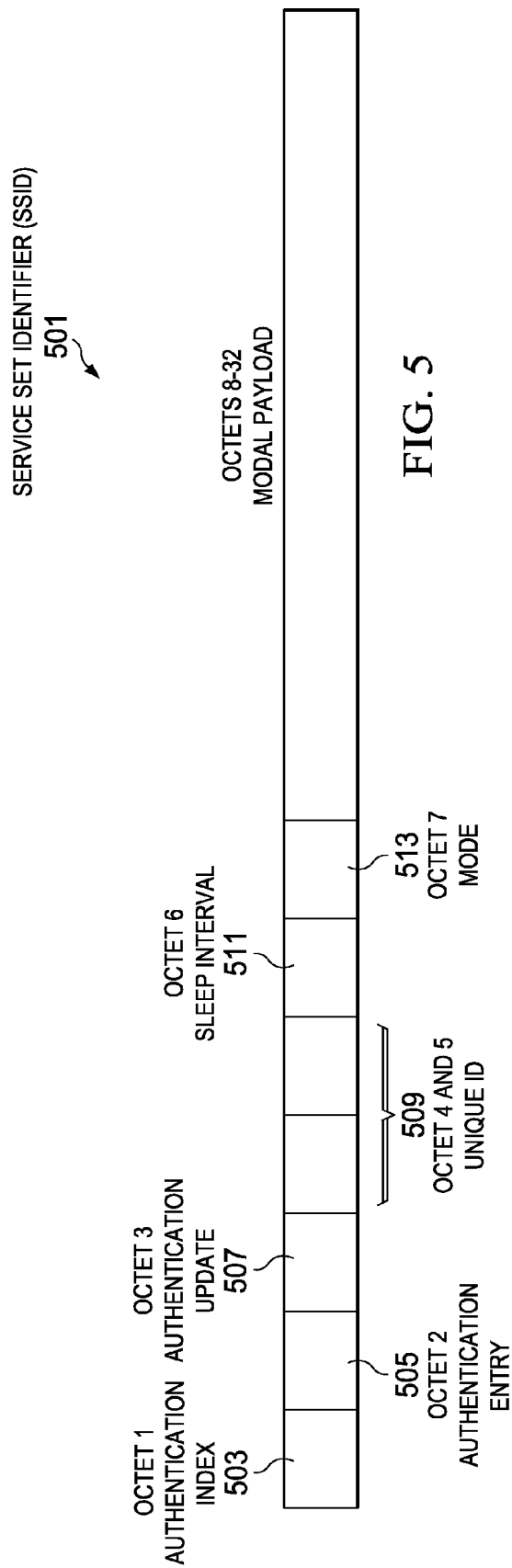
FIG. 5 depicts an example of how the 32 bytes allocated for an SSID might be used to enable each command to be independently authenticated.

FIG. 5 depicts an example of how the 32 bytes allocated for a Service Set Identifier (SSID) 501 might be used to enable each command to be independently authenticated. Authenticated SSIDs are authenticated with a shared authentication table 503-505 which is updated 507 upon successful reception of each command so that other unauthenticated devices may not successfully parrot encrypted control commands with a duplicate MAC address. The Unique ID 509 indicates which device the message is for. Authentication Table Entries are randomly updated 507 with every command. An initial 256 byte table is sent during an initial associated connection. The Sleep interval 511 indicates how long the home automation device should sleep before waking up to send another probe request and listen for responses. The Mode 513 indicates which protocol subset might be encoded in the payload, SEP, WSB, HA, etc. The entire SSID message is AES 128 Encrypted based on an authentication key provided at reset/power up.

Figure 6:
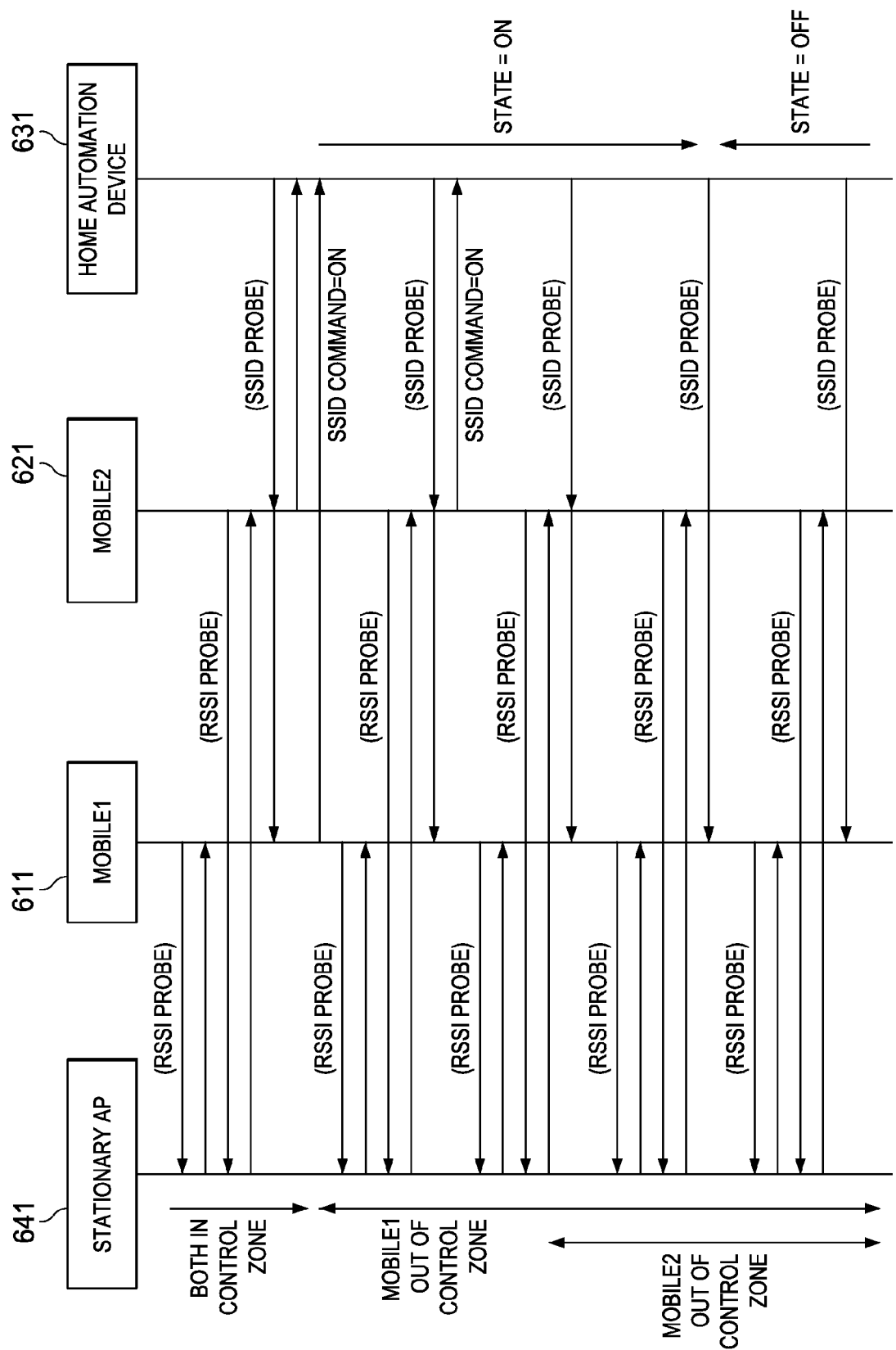
FIG. 6 depicts an example of how lights in an area which have been manually turned on and off by the user for some time may subsequently be automatically turned on and off when a controlling mobile enters or leaves its control zone.

In addition to updating the sleep interval of automation devices based on mobile location, it may be desirable to also automatically update the state of some home automation devices (i.e., lights). Home automation device states may be learned via a history of manual controls in the same way that sleep interval adaptation takes place. FIG. 6 depicts an example of how lights in an area which have been manually turned on and off by the user for some time may subsequently be automatically turned on and off when a controlling mobile enters or leaves its control zone. Home Automation Device 631 periodically wakes up and sends a broadcast probe request with both Mobile1 611 and Mobile2 621 response. Both mobiles respond with a command to turn on because the RSSI of the probe responses they have received from Stationary AP 641 have RSSIs that correspond to the control zone of Home Automation Device 631. Home Automation Device 631 wakes up again after some specified sleep interval to send another probe request. Mobile1 611 has subsequently moved out of the control zone. Mobile1 611 in this case is no longer in the control zone of HAD 631 and so does not respond. Mobile2 621 SSID RSSIs still indicate it is within the control zone of HAD 631 and so responds with an ON command, Mobile2 621 subsequently moves to an area in which probe responses from Stationary AP 641 indicate it is not within the control zone of HAD 631 and so no longer responds to Home Automation Device 631 probe requests. After sending a few more probe requests without response, Home Automation Device 631 transitions to the OFF state.

Figure 7:
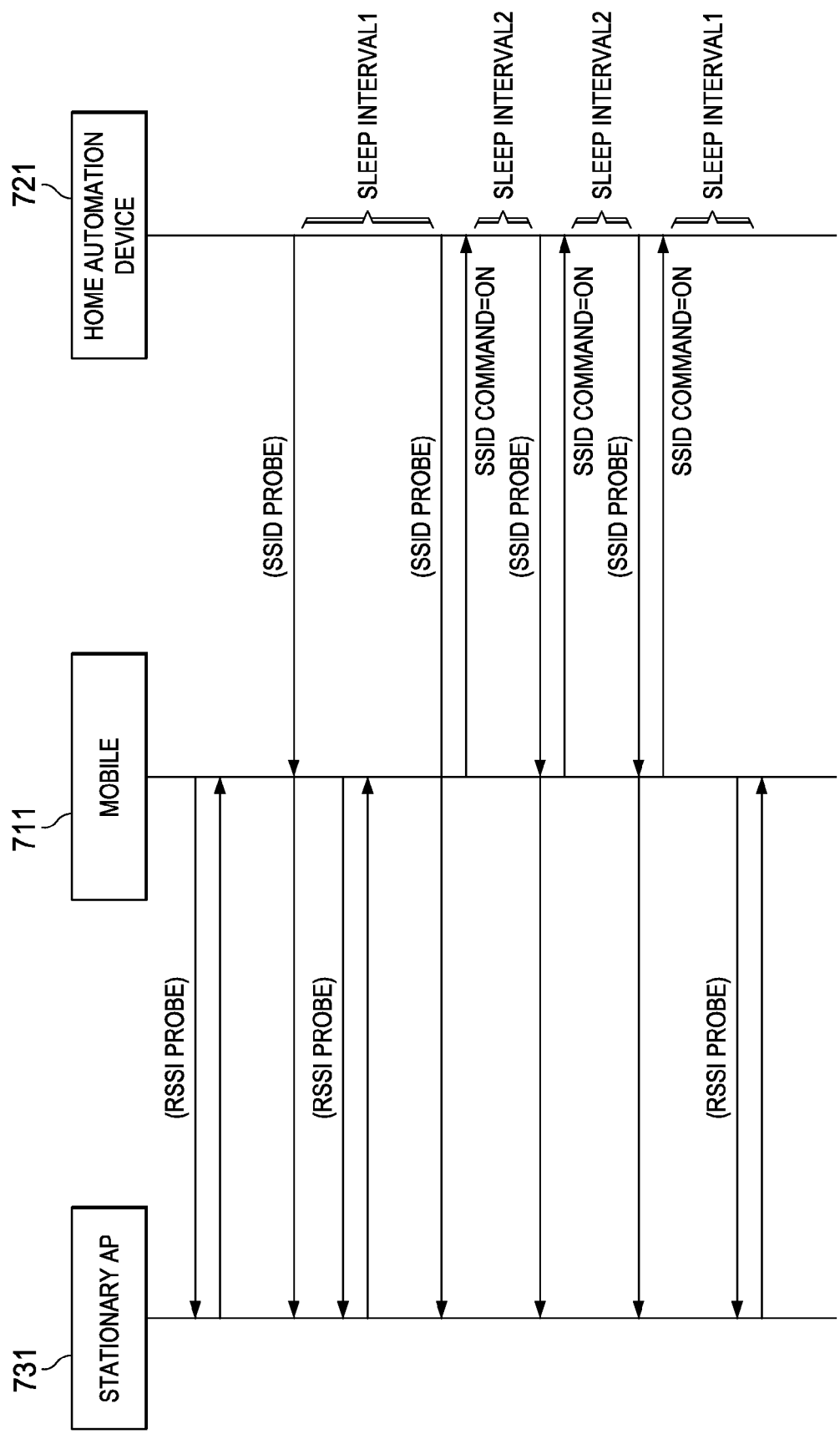
FIG. 7 depicts an example of how a mobile might automatically turn on a Home Automation Device (HAD) because it has determined via the Received Signal Strength Indicator (RSSI) of surrounding APs that it has entered an area in which the mobile user has historically sent the HAD a command to go to a given state.

The sleep interval should also be adapted surrounding an automated state transition to enable a controlling mobile to quickly reverse an automated action. FIG. 7 depicts and example in which Home Automation Device 721 is waking up with long sleep interval1 until Mobile 711 receives a probe response from Stationary AP 731 with RSSI indicating it is within the control zone of Home Automation Device 721. It subsequently sends a probe response with SSID command to turn ON Home Automation Device 721 and decreased sleep interval2. Mobile 711 continues to respond to Home Automation Device 721 probe requests with SSID command to turn ON Home Automation Device 721 with shortened sleep interval in order to enable the user of Mobile 711 to override the automated command. This low latency response period may be accompanied with a User Interface (UI) prompt to the user on Mobile 711 which may disappear after some period of time if action is not taken. After some period of time, Mobile 711 continues to send the SSID command to turn on Home Automation Device 721 but with lengthened sleep interval1 with the assumption that the mobile user is satisfied with the automated action taken.

In addition to RSSI characteristics of a previously encountered set of SSIDs, a mobile device might also use an integrated accelerometer in order to determine when the mobile might be leaving the environment and when an automated state transition should be triggered. For example, common step recognition algorithms which look for periodic variations exceeding some threshold on the gravity vector of a tri-axial accelerometer could be used to determine when a person is moving. When a mobile device senses user interaction or can determine through its accelerometer that a person has begun moving, it can begin scanning for changes in location. If the mobile device detects it is leaving an environment in which a specific set of SSID RSSIs had previously matched those associated with a home automation device, it might send a message to turn off that device. If the mobile detects that motion has stopped and that it has entered an environment in which a specific set of SSID RSSIs had previously matched those associated with a home automation device, it might then send a message to turn on that device. Triggering automation events only after it was determined that a person is no longer moving for some period of time prevents against turning devices on and off unnecessarily as a mobile user walks through multiple rooms in a home.

Other mobile device information might also be used to establish further context for an automated control event. For example, the time associated with manual control events could be used to determine that lights are only turned on in a specific area at night. Similarly, calendar events might be entered by the user to establish some desired pattern of automation. The mobile's home automation application would look for messages to send based on specified calendar events associated with a device ID. For example, "outsidelights=ON", or "garagedoor=CLOSED". The mobile application might enable the user to assign whatever label he or she wanted as part of the initial setup of the device. These labels could then be parsed in calendar event subjects.

Although specific embodiments of the invention have been described and illustrated, the invention is not to be limited to the specific forms or arrangements of parts so described and illustrated. For instance, the method could be implemented at the application level for use on mobile devices based upon another operating system. The invention is limited only by the appended claims.

What is claimed is:

1. A method for automation and control of wireless devices comprising:
   receiving in a device an encryption key and authentication table from a mobile device, wherein said device uses this key to subsequently encrypt both control and authentication information in a Service Set Identifier (SSID); and
   said device using the encryption key and authentication table in accepting only encrypted and authenticated SSID information from other devices.

2. The method as recited in claim 1 wherein said device receives an encoded SSID message which instructs it to associate or disassociate with a wireless network.

3. The method as recited in claim 1 wherein said wireless device is one of the group comprised of a Station and a Wi-Fi Direct device.

4. The method as recited in claim 1 wherein a remote mobile device which has provided encryption keys to a home automation device; and
   configures a stationary Access Point (AP) to send an encoded SSID response to said home automation device.

5. The method as recited in claim 1 wherein said wireless device is a peer to peer connected device.

6. The method as recited in claim 1 wherein said mobile device configures an Access Point (AP) to send an encoded SSID response to said device.

7. A method for automation and control of wireless devices comprising:
   receiving in a device an encryption key and authentication table from a mobile device, wherein said device uses this key to subsequently encrypt both control and authentication information in the Service Set Identifier (SSID);
   said device using key authentication table in accepting only encrypted and authenticated SSID information from other devices; and
   wherein said device translates Smart Energy Protocol communication to and from said encoded SSID.

8. A method for automation and control of wireless devices comprising:
   receiving in a device an encryption key and authentication table from a mobile device, wherein said device uses this key to subsequently encrypt both control and authentication information in the Service Set Identifier (SSID);
   said device using the encryption key and authentication table in accepting only encrypted and authenticated SSID information from other devices; and
   wherein said device translates Smart Energy Protocol communication to and from said encrypted SSID information.

9. A wireless device comprising:
   a receiver for receiving an encryption key and authentication table from a mobile device, wherein said key is used to subsequently encrypt both control and authentication information in the Service Set Identifier (SSID); and logic for accepting only encrypted and authenticated SSID information from other devices by using the received encryption key and authentication table.

10. The wireless device as recited in claim 9 wherein said device receives an encoded SSID message which instructs it to associate or disassociate with a wireless network.

11. The wireless device as recited in claim 9 wherein said wireless device is a peer to peer connected device.

12. The wireless device as recited in claim 9 wherein a second wireless device provides said encryption key; and configures an Access Point (AP) to send an encoded SSID response to said wireless device.

13. A wireless device comprising:

a receiver for receiving an encryption key and authentication table, wherein said key is used to subsequently encrypt both control and authentication information in the Service Set Identifier (SSID);

logic for accepting only encrypted and authenticated SSID information from another device after said encryption key and authentication table are received; and wherein said wireless device communicates with said another device using Smart Energy Protocol communication after encrypted and authenticated SSID information provided by said another device is accepted by said wireless device.

* * * * *